March 21, 1961     C. VAN DER LELY ET AL     2,976,059
AGRICULTURAL IMPLEMENTS HAVING DRAW-BARS
Filed July 18, 1957     3 Sheets-Sheet 2
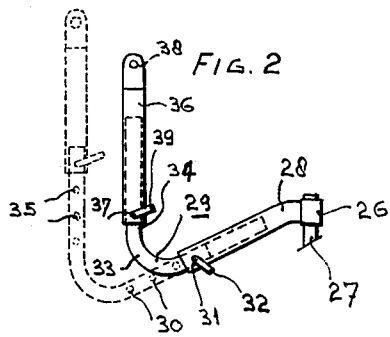
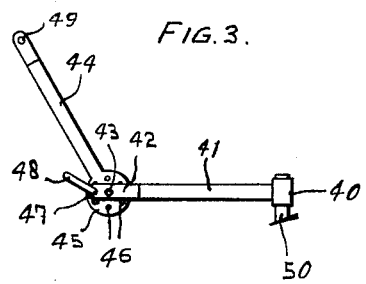
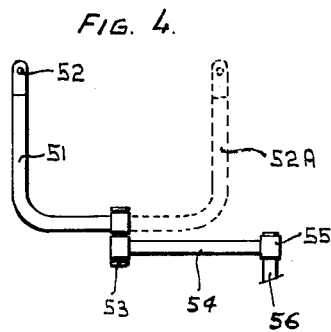
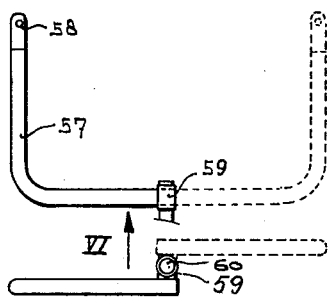
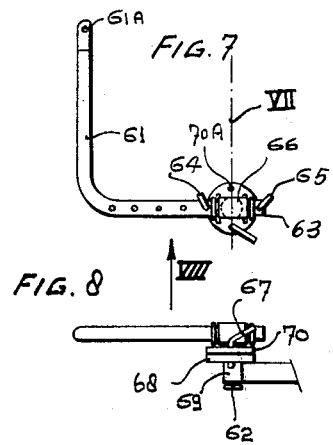
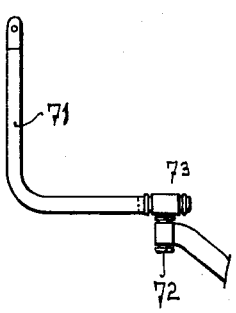

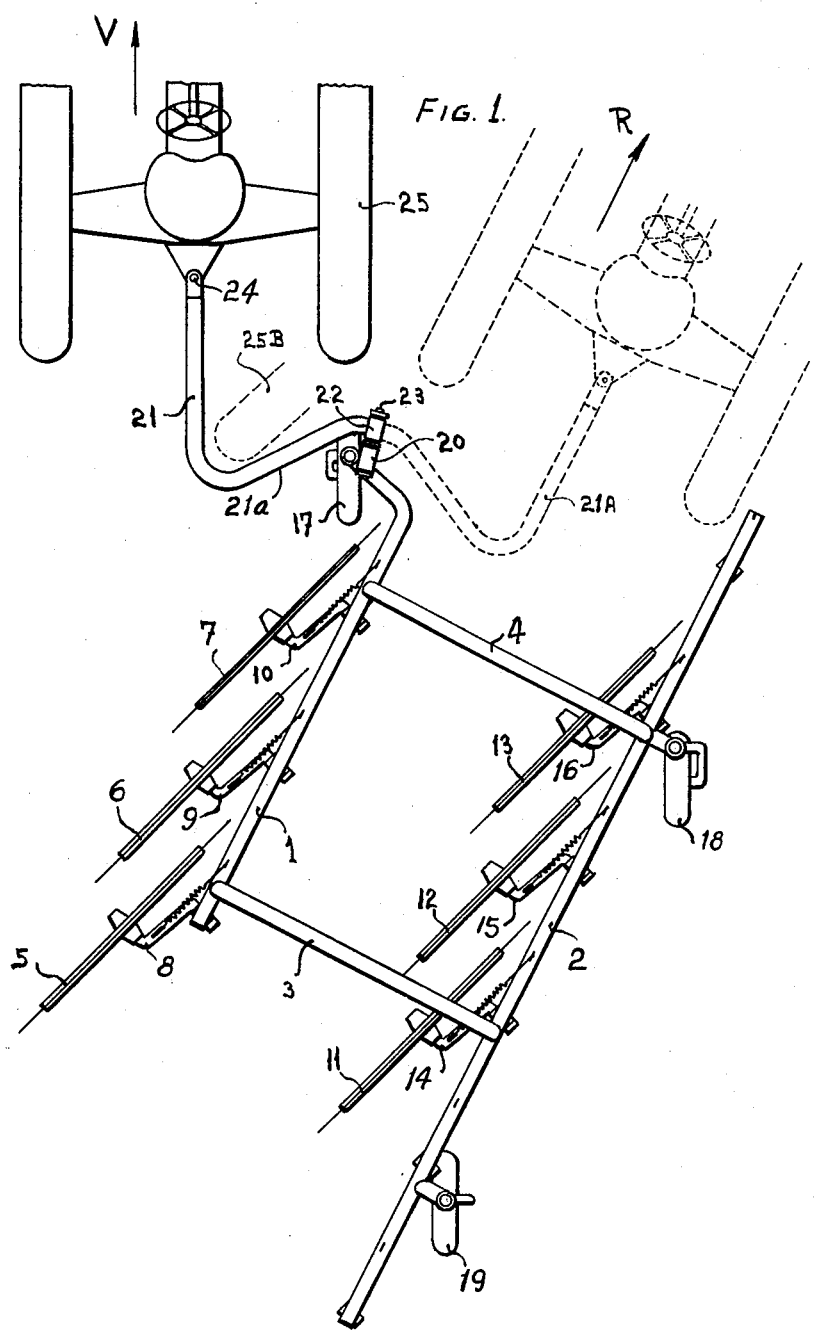

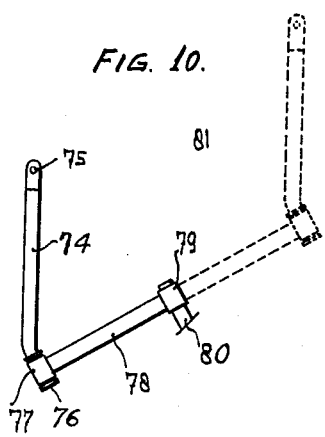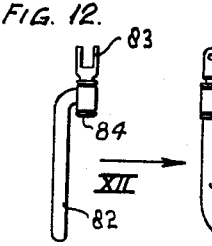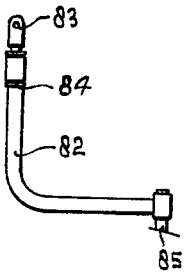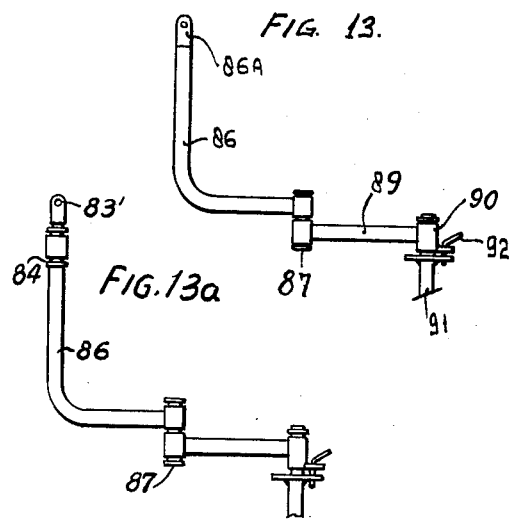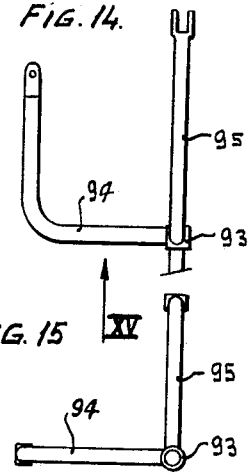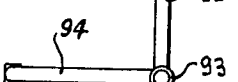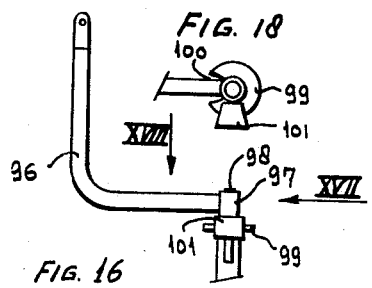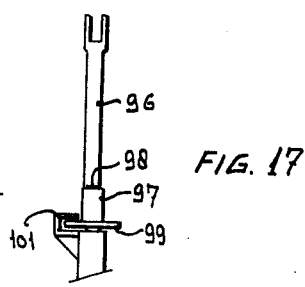

United States Patent Office 2,976,059
Patented Mar. 21, 1961

2,976,059
AGRICULTURAL IMPLEMENTS HAVING DRAW-BARS

Cornelis van der Lely and Ary van der Lely, Maasland, Netherlands, assignors to C. van der Lely N.V., Weverskade, Maasland, Netherlands, a Dutch limited company of the Netherlands Filed July 18, 1957, Ser. No. 672,710

Claims priority, application Netherlands July 27, 1956

6 Claims. (Cl. 280—456)

This invention relates to agricultural implements having draw-bars through which the tractive forces required to move the implements can be exerted.

It is an object of the invention to provide an improved draw-bar, by means of which an implement can be drawn by a prime mover such as a mechanical device or a draft animal, the arm being yieldable in a vertical direction and being readily adjustable to different working positions of the implement.

According to the invention, there is provided an agricultural implement having a draw-bar through which a tractive force required to move the implement can be exerted. The draw-bar is connected to the implement so as to be freely rotatable about a substantially horizontal, first axis of rotation which lies at an angle of less than 90° to the intended direction of travel of the implement, the arrangement being such that the draw-bar can be turned about said axis so as to cause the traction point of the draw-bar to occupy different positions relative to the implement.

It is thus possible to adjust the draw-bar to substantially different working positions of the implement.

The draw-bar, can, in one form, be adjusted angularly with respect to the horizontal axis of rotation or in a direction which is parallel to the horizontal axis of rotation. Thus the traction point can be readily displaced relative to the implement to obtain the correct position with respect to the implement.

The draw-bar is preferably rotatable at least in part about a second axis which is parallel to the first-mentioned substantially horizontal axis of rotation, and this provides the possibility of moving the draw-bar (as seen from above) to the other side of the said axis of rotation without disengaging the implement. It is desirable in this case that the second axis should lie at substantially equal distances from the free end of the draw-bar and from the first axis of rotation.

Advantageously, the point of connection of the draw-bar to the implement is pivotable with respect to the draw-bar about an axis which is parallel to the axis of rotation. Thus the traction point can always be caused to lie in the correct plane irrespective of the plane in which the draw-bar is located.

For a better understanding of the invention, and to show how the same may be carried into effect, reference will now be made to the accompanying drawings, in which:

Fig. 1 is a plan view of an agricultural implement, which is linked to a tractor, Figs. 2, 3 and 4 are plan views of different draw-bars, Fig. 5 is a plan view of a further draw-bar, Fig. 6 is an elevation in the direction of the arrow VI of Fig. 5, Fig. 7 is a plan view of another draw-bar, Fig. 8 is an elevation in the direction of the arrow VIII of Fig. 7, Figs. 9 and 10 are plan views of still further draw-bars, Fig. 11 is a plan view of yet another draw-bar, Fig. 12 is an elevation in the direction of the arrow XII of Fig. 11, Fig. 13 is a plan view of a further draw-bar, Fig. 13a illustrates a further embodiment of the invention, Fig. 14 is a plan view of yet a further draw-bar, Fig. 15 is an elevation in the direction of the arrow XV of Fig. 14, Fig. 16 is a plan view of still another draw-bar, Fig. 17 is an elevation in the direction of the arrow XVII of Fig. 16, and Fig. 18 is an elevation in the direction of the arrow XVIII of Fig. 16.

Referring now to Fig. 1, there is shown an agricultural implement connected to a tractor or prime mover. The implement is a swath turner comprising two parallel tubular frame members 1 and 2, which are inter-connected by tubular bows 3 and 4. Rake wheels 5, 6 and 7 are connected to the frame member 1 by means of cranks 8, 9 and 10, and rake wheels 11, 12 and 13 are connected to the frame member 2 by means of cranks 14, 15 and 16. The implement is supported by ground wheels 17, 18 and 19, of which the wheels 17 and 18 are caster wheels and the wheel 19 is rotatable about a vertical axis, there being locking means (not shown) for securing the wheel 19 in desired and different positions relative to the frame member 2. A bearing 20 is rigidly secured to the frame member 1, and a draw-bar mechanism including traction portion 21, which is provided with a laterally extending arm 21a supporting a bearing 22, is coupled to the bearing 20 by means of a shaft 23, about which the draw-bar is freely rotatable and the substantially horizontal and longitudinal axis of which will be referred to as the first axis of rotation of the draw-bar. It is to be noted that said traction portion and arm are in a generally horizontal plane. The draw-bar 21 is linked at its front end or traction portion 24 with the tractor 25, which is arranged to move the implement. The draw-bar 21 is substantially V-shaped, and is curved backwardly, from the bearing 22, is then bent through an angle of nearly 90°, and finally continues as a straight portion at the free end of which the point of traction 24 is located.

In the operation of the implement, the implement is moved forward by the tractor in the direction of the arrow V, and the rake wheels 5, 6 and 7 and the rake wheels 11, 12 and 13 will be caused to rotate owing to their contact with the ground, so that they will laterally displace crop lying on the ground. Lateral forces will then be exerted on the implement, which forces are taken up by the ground wheel 19 and, via the horizontal shaft 23, by the tractor 25. Owing to the horizontal disposition of the shaft 23, lateral forces exerted on the implement can be transferred to the tractor 25.

The shape of the draw-bar 21 is chosen to permit the rear wheel of the tractor to take up the position 25B when the tractor is driven round a corner, whereby the rear wheel does not come into contact with the draw-bar. In order to obtain a suitable transport position for the implement, the draw-bar 21 can be turned about the horizontal shaft 23 into the position 21A, in which the tractor 25 can move the implement in the direction R. When the draw-bar is in the position 21A, the tractor can be positioned centrally in front of the implement, so that transport of the implement can be achieved in a satisfactory manner.

Many modifications of the draw-bar 21 are possible and many of these modifications will be designed in dependence upon the particular agricultural implement employed, or the use to which such an implement is to be put.

Referring now to Fig. 2, there is shown a draw-bar consisting of a tube 28 having a bearing 26, mounted for rotation about a shaft 27, which is secured to the frame of the implement, and the axis of which constitutes the first axis of rotation of the draw-bar. A tube or member 29 fits into the tube 28, and is formed with holes 30, adapted to register with a hole 31 formed in the tube 28. A locking pin 32 can be passed through the hole 31 and a registering one of the holes 30, so that the tube 29 can be secured in different positions relative to the tube 28. The tube 29 is curved to form a bend 33 and has a straight end 34, in which holes 35 are formed. A tube or member 36 fits about the end 34, one end of the tube 36 being formed with a hole 37 and the other end constituting the traction point 38. By passing a locking pin 39 through the hole 37 and a registering one of the holes 35, the tube 36 can be secured in different positions relative to the end 34 of the tube 29. With this construction the traction point 38 can be angularly displaced with respect to the first axis of rotation as well as parallel to said first axis. In the position indicated by broken lines the traction point 38 has been displaced relative to said axis.

The draw-bar shown in Fig. 3 comprises a tube 41 at one end of which is provided a bearing 40 and at the other end of which is provided a fork 42. An arm 44 is secured to the tube 41 by means of a vertical pin 43, the axis of which constitutes a second axis of rotation of the draw-bar, such axis being substantially vertical. One end of the arm 44 is constituted by a disc 45, formed with holes 46. The fork 42 is formed with a hole 47, and by passing a locking pin 48 through the hole 47 and a registering one of the holes 46, the arm 44 can be fixed in different positions relative to the tube 41, so that the point of traction 49 can be displaced relative to a shaft 50, which is secured to the frame of the implement. The tube 41 and the arm 44 may be displaced in alignment, so that a long draw-bar can be obtained, and in this case, the axis of the shaft 50 (constituting the first axis of rotation), must extend substantially transverse to the intended direction of travel. However, the draw-bar can be disposed at a different position on the implement, and, in this case, the axis of the shaft 50 extends substantially in the intended direction of travel, the tube 41 and the arm 44 being at a large angle of, for example 60° to one another.

Referring now to Fig. 4, there is shown a draw-bar which is constituted by a curved arm 51, having a traction point 52 and mounted for rotation about a pivot device or shaft 53, the axis of which constitutes a third axis of rotation, such axis being substantially horizontal. The arm 51 is connected by the shaft 53 to a second arm 54, which has a bearing 55, mounted for rotation about a shaft 56, the axis of which constitutes the first axis of rotation, and which is secured to the implement. This draw-bar permits adjustment of the traction point 52 to four different positions relative to the implement, i.e. in a position 52A indicated in broken lines, which is symmetrical relative to the traction point 52 of the shaft 53, and in two positions which are symmetrical relative to the traction points 52 and 52A, and which lie one on each side of the plane of the drawing. This draw-bar permits displacement of the traction point without the need for disengaging the implement from the tractor.

The draw-bar shown in Figs. 5 and 6 consists of a curved tube 57, which has a traction point 58. The tube 57 has a bearing 59, which does not lie in the plane of the tube 57, so that, in one position, the tube 57 can occupy a position below an axis 60 which is the first axis of rotation, and can occupy a position above the axis 60, as is indicated by broken lines. If the different positions of the draw-bar require the traction point to lie at different heights, such a draw-bar may be employed.

Referring now to Figs. 7 and 8, there is shown a draw-bar including an arm 61, having a traction point 61A. The arm 61 is rotatable about a vertical shaft 62 and about a horizontal shaft 63, the axis of which constitutes the first axis of rotation, this axis intersecting the axis of the shaft 62. The arm 61 is slidable in a bearing 66, there being locking pins 64 and 65 for preventing such displacement, and a locking pin 67 is provided for fixing the arm 61 in position relative to the vertical shaft 62, such fixing being obtained by passing the locking pin through one of a plurality of holes formed in a disc 68, which is rigidly secured to a bearing 69, secured to the frame of the implement, and through a registering hole in a disc 70, which is formed with a plurality of holes 70A, the disc 70 being rigidly secured to the bearing 66.

In order to move the traction point 61A to the other side of a vertical plane VII, in which lies the axis of vertical shaft 62, the locking pins 64 and 65 can be removed, after which the draw-bar can be detached from the bearing 66 and be re-introduced into the bearing 66 in a manner such that the traction point 61A lies on the other side of the vertical plane VII. It is, however, possible to disengage the locking pin 67, to turn the draw-bar through 180° about the vertical shaft 62 and again through 180° about the horizontal shaft 63, after which the locking pin 67 can be re-introduced.

Referring now to Fig. 9, there is shown a draw-bar which is constituted by a curved tube 71, which is rotatable about two horizontal shafts 72 and 73, the axes of which intersect one another at right angles, the axis of the shaft 72 constituting the first axis of rotation.

The draw-bar shown in Fig. 10 is constituted by an arm 74, having a traction point 75, the arm 74 being rotatable about a shaft 76. The shaft 76 is itself rotatable in a bearing 77, which is connected to a bearing 79 by means of an arm 78, the bearing 79 being rotatable about a shaft 80, which is rigidly secured to the frame of the implement and the axis of which constitutes the first axis of rotation. The shafts 76 and 80 are parallel to one another and are at an angle to the direction of the arm 74. By turning the arm 74 about the shafts 76 and 80, to the position indicated by broken lines, the traction point 75 is caused to lie further towards the front end.

The draw-bar shown in Figs. 11 and 12 has an arm 82 at one end of which is mounted an element 83 formed in the shape of a fork and rotatable about a shaft 84, which is parallel to a shaft 85, the axis of which constitutes the first axis of rotation. As the arm 82 is freely rotatable about the shaft 85, so that it can compensate for the differences in height between the implement and the tractor, the fork 83 which is freely adjustable about the shaft 84 is advantageous, since even with the largest differences in height it cannot be jammed.

Referring now to Fig. 13, there is shown a draw-bar having an arm 86 having a traction point 86A, the arm 86 being rotatable about a shaft 87. The shaft 87 is connected to a bearing 90, which can be rotated about and fixed relative to a shaft 91, the axis of which constitutes the first axis of rotation. A locking pin 92 is provided for preventing rotation of the arm 89 about the shaft 91, and, by removing the locking pin 92, the traction point can be displaced into a symmetrical position on the other side of the shaft 91 without the need for disengaging the machine from the prime mover. An adjustable fork such as the fork 83' shown in Figs. 11 and 12 may, with advantage, be mounted at the end of the arm 86 in this case.

The draw-bar shown in Figs. 14 and 15 has a bearing 93 on which are mounted two differently shaped arms 94 and 95, each of which is adapted for use in different working positions of the implement. The transition from one working position into the other requires, in this case, only a turn of one of the arms through 90°, that arm, which is not employed, then projecting upwardly without forming a troublesome obstacle.

Referring now to Figs. 16, 17 and 18, there is shown a draw-bar having an arm 96 at one end of which is a bearing 97. The bearing 97 is rotatable about a shaft 98, in which a recess 100 is formed. A strap 101 is rigidly secured to the implement and has approximately the same shape as the recess 100 in the disc 99. By turning the bearing 97 about the shaft 98, the recess 100 can be moved to a location just in front of the strap 101, after which the arm 96 can be readily detached from the machine. This fastening of the draw-bar to the implement is suitable for implements which require the draw-bar to be situated at different places.

It is possible to combine the various, aforesaid draw-bars or features thereof in various ways to provide a draw-bar which is suitable for any particular implement.

What we claim is:

1. Apparatus comprising a draw-bar mechanism, an implement, wheels on and supporting said implement, a prime mover, wheels on said prime mover, said mechanism coupling said implement to said prime mover; said mechanism comprising a longitudinally extending traction portion pivotally connected to said prime mover about a vertical axis, an arm fixed to and extending substantially laterally from said traction portion, said traction portion and arm lying generally in a horizontal plane, means on the free end of said arm, coupled to said implement and defining a substantially horizontal and longitudinal axis about which the implement and the wheels thereon are freely pivoted, and a ground wheel supporting said means, said arm forming an angle of less than 90 degrees with said traction portion and with said substantially horizontal and longitudinal axis.

2. Apparatus as claimed in claim 1, wherein said arm comprises telescopically engaged sections whereby the length of said arm is adjustable.

3. Apparatus as claimed in claim 1, comprising means adjustably connecting said traction portion and said arm.

4. Apparatus as claimed in claim 1, wherein said traction portion comprises telescopically engaged sections whereby the length of said traction portion is adjustable.

5. Apparatus as claimed in claim 1 comprising a fork member pivotally connecting said traction portion to said prime mover.

6. Apparatus as claimed in claim 5 comprising means pivotally connecting said fork member to said traction portion.

References Cited in the file of this patent

UNITED STATES PATENTS

| | | |
|---|---|---|
| 2,430,770 | Hyler | Nov. 11, 1947 |
| 2,447,354 | Morrill | Aug. 17, 1948 |
| 2,665,144 | Birdwell | Jan. 5, 1954 |
| 2,702,193 | Taylor et al. | Feb. 15, 1955 |

FOREIGN PATENTS

| | | |
|---|---|---|
| 503,387 | France | June 15, 1951 |
| 669,837 | Great Britain | Apr. 9, 1952 |